US010714916B2

(12) United States Patent
Okamoto et al.

(10) Patent No.: US 10,714,916 B2
(45) Date of Patent: Jul. 14, 2020

(54) PROTECTOR

(71) Applicants: Yazaki Corporation, Tokyo (JP); TOYOTA JIDOSHA KABUSHIKI KAISHA, Toyota-shi, Aichi-ken (JP)

(72) Inventors: Daisuke Okamoto, Toyota (JP); Yoshimichi Yamao, Toyota (JP); Hiroki Uno, Aichi-ken (JP)

(73) Assignees: YAZAKI CORPORATION, Minato-ku, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/028,712

(22) Filed: Jul. 6, 2018

(65) Prior Publication Data

US 2019/0036313 A1    Jan. 31, 2019

(30) Foreign Application Priority Data

Jul. 26, 2017    (JP) .................. 2017-144643

(51) Int. Cl.
*H02G 3/04*    (2006.01)
*B60R 16/02*    (2006.01)
*H01B 7/00*    (2006.01)

(52) U.S. Cl.
CPC ....... *H02G 3/0437* (2013.01); *B60R 16/0215* (2013.01); *H01B 7/0045* (2013.01); *H02G 3/0418* (2013.01)

(58) Field of Classification Search
CPC .............. B60R 16/0215; H01B 7/0045; H02G 3/0418; H02G 3/0437; H02G 3/32
See application file for complete search history.

(56) References Cited

U.S. PATENT DOCUMENTS

| 5,444,182 | A | * | 8/1995 | Hoshino | .............. | H01R 13/506 |
| | | | | | | 174/72 A |
| 6,211,465 | B1 | * | 4/2001 | Streit | .................. | H02G 3/0691 |
| | | | | | | 16/2.1 |
| 6,368,009 | B1 | * | 4/2002 | Noda | ....................... | B60J 3/023 |
| | | | | | | 403/329 |

(Continued)

FOREIGN PATENT DOCUMENTS

CN    203942225 U    11/2014
CN    206004248 U    3/2017

(Continued)

Primary Examiner — William H. Mayo, III
Assistant Examiner — Rhadames Alonzo Miller
(74) Attorney, Agent, or Firm — Sughrue Mion, PLLC

(57) ABSTRACT

A protector includes a main body formed with an accommodation part by a bottom wall part and side wall parts, a lid body mounted on the main body to cover the accommodation part, and a flange part that extends along a longitudinal direction of the main body with a gap at an upper portion in parallel with an outer surface of at least one of the side wall parts of the main body. A plurality of engagement holes are provided at a lower portion of the flange part. A plurality of engagement claws that are provided on at least one edge part of the lid body are locked with engagement edge parts of the engagement holes when the plurality of engagement claws are inserted into the gap between the flange part and the side wall part which faces the flange part with the gap.

7 Claims, 6 Drawing Sheets

(56) References Cited

U.S. PATENT DOCUMENTS

| | | | | |
|---|---|---|---|---|
| 6,875,918 B2* | 4/2005 | Sudo | | H02G 3/0468 |
| | | | | 138/108 |
| 7,484,534 B2* | 2/2009 | Schmidt | | F16L 9/22 |
| | | | | 138/106 |
| 7,581,564 B2* | 9/2009 | Tanaka | | F16L 21/06 |
| | | | | 138/110 |
| 7,591,286 B2* | 9/2009 | Howard | | H02G 9/065 |
| | | | | 138/108 |
| 8,070,212 B2* | 12/2011 | Shima | | B60R 16/0207 |
| | | | | 296/146.9 |
| 8,124,887 B2* | 2/2012 | Suzuki | | B60R 16/0215 |
| | | | | 174/481 |
| 8,847,073 B2* | 9/2014 | Tokunaga | | B60R 16/0215 |
| | | | | 174/68.1 |
| 9,698,522 B2* | 7/2017 | Markefka | | H01R 13/5804 |
| 2002/0061676 A1* | 5/2002 | Kameyama | | H01R 4/2429 |
| | | | | 439/404 |
| 2003/0181093 A1* | 9/2003 | Negishi | | H01R 4/2433 |
| | | | | 439/404 |
| 2003/0213607 A1* | 11/2003 | Katsumata | | H02G 3/0487 |
| | | | | 174/68.3 |
| 2003/0222183 A1* | 12/2003 | Kato | | B60R 16/0215 |
| | | | | 248/49 |
| 2004/0163230 A1* | 8/2004 | Nakamura | | B25B 27/28 |
| | | | | 29/464 |
| 2004/0182973 A1* | 9/2004 | Kawai | | F16L 3/1075 |
| | | | | 248/71 |
| 2005/0217888 A1* | 10/2005 | Arai | | H02G 3/0418 |
| | | | | 174/72 A |
| 2005/0260874 A1* | 11/2005 | Murakami | | H01R 4/2433 |
| | | | | 439/142 |
| 2006/0090916 A1* | 5/2006 | Suzuki | | H02G 3/0691 |
| | | | | 174/481 |
| 2007/0128929 A1* | 6/2007 | Oga | | F16L 3/1025 |
| | | | | 439/578 |
| 2007/0272807 A1* | 11/2007 | Takagaki | | F16B 21/086 |
| | | | | 248/71 |
| 2008/0023223 A1* | 1/2008 | Suzuki | | H02G 3/0481 |
| | | | | 174/72 A |
| 2009/0017653 A1* | 1/2009 | Shimizu | | H02G 3/081 |
| | | | | 439/95 |
| 2009/0042444 A1* | 2/2009 | Shimizu | | H01R 4/185 |
| | | | | 439/620.21 |
| 2009/0167461 A1* | 7/2009 | Oiwa | | B60R 16/0207 |
| | | | | 333/181 |
| 2009/0211781 A1* | 8/2009 | Suzuki | | B60R 16/0215 |
| | | | | 174/101 |
| 2013/0075155 A1* | 3/2013 | Kawai | | B60R 16/0215 |
| | | | | 174/700 |
| 2013/0126233 A1* | 5/2013 | Nagayasu | | B60R 16/0215 |
| | | | | 174/72 A |
| 2014/0124261 A1* | 5/2014 | Mizuhira | | B60R 16/0215 |
| | | | | 174/74 R |
| 2015/0305174 A1* | 10/2015 | Yoshimura | | B60R 16/0222 |
| | | | | 174/668 |
| 2015/0343968 A1* | 12/2015 | Nagayasu | | B60R 16/0215 |
| | | | | 248/68.1 |
| 2016/0020000 A1* | 1/2016 | Doushita | | F16B 21/086 |
| | | | | 174/72 A |

FOREIGN PATENT DOCUMENTS

| | | |
|---|---|---|
| JP | 2014023215 A | 2/2014 |
| JP | 2015033206 A | 2/2015 |
| JP | 2017017965 A | 1/2017 |

* cited by examiner

PROTECTOR

CROSS REFERENCE TO RELATED APPLICATIONS

This application is based on Japanese Patent Application (No. 2017-144643) filed on Jul. 26, 2017, the contents of which are incorporated herein by reference.

BACKGROUND OF THE INVENTION

1. Field of the Invention

The present invention relates to a protector.

2. Description of the Related Art

For example, a protector that is mounted on an electrical wire bundle of a wire harness includes a main body and a lid body that are engaged with each other, thereby forming a cylindrical body in which the electrical wire bundle is able to be accommodated, and a plurality of lock parts by which the main body and the lid body are able to be engaged with each other. The lock part includes a receiving part that is formed on an outer surface side of a side wall part of the main body, and an engagement piece that is formed in the lid body. Specifically, the engagement piece and the receiving part are engaged with each other in such a manner that the lid body is placed to cover the main body, such that the lid body and the main body are assembled to each other (for example, refer to JP-A-2015-33206).

Alternatively, in the case of the lock part, the lid body and the main body are assembled to each other in such a manner that the engagement piece of the lid body is engaged with the receiving part that is formed on an inner surface side of the side wall part of the main body (for example, refer to JP-A-2014-23215 and JP-A-2017-17965).

Meanwhile, the outer surface side of the lock part disclosed in JP-A-2015-33206 is formed to be an uneven shape, that is to say a concave-convex shape has the receiving part on the outer surface of the side wall part of the main body. Accordingly, the lock part does not have a desirable appearance. Further, when the protector is fixed to a mounted part of a vehicle body and the wire harness is wired along a vehicle body surface, the receiving part may interfere with a peripheral component, a structure, and the like, thereby causing damage thereof.

In contrast, in the case of the lock part disclosed in JP-A-2014-23215 and JP-A-2017-17965, since the receiving part is provided on the inner surface of the side wall part of the main body, the lock part has a desirable appearance and further it is advantageously possible to suppress the receiving part from interfering with the peripheral component, the structure, and the like. However, an accommodation part of the main body in which the electrical wire bundle is accommodated becomes narrow, such that accommodation workability of the electrical wire bundle may deteriorate.

Further, for example, with respect to any of the protectors disclosed in JP-A-2015-33206, JP-A-2014-23215, and JP-A-2017-17965, when the electrical wire bundle accommodated in the main body is lifted and a force, by which the electrical wire bundle is separated from the main body, is exerted on the lid body, the aforementioned force is intensively exerted on the receiving part and a formation portion of the receiving part, thereby causing damage of the receiving part.

SUMMARY OF THE INVENTION

The present invention has been made in an effort to provide a protector having a desirable appearance that is capable of suppressing an engagement portion between a main body and a lid body from being damaged in consideration of the drawbacks described hereinabove.

The above-described object of the present invention is achieved by the following configuration.

(1) A protector including:

a main body that is formed with an accommodation part for accommodating an electrical wire bundle by a bottom wall part and side wall parts which are respectively erected from both side edges of the bottom wall part;

a lid body that is mounted on the main body to cover the accommodation part; and a flange part that extends along a longitudinal direction of the main body with a gap at an upper portion in parallel with an outer surface of at least one of the side wall parts of the main body, wherein a plurality of engagement holes are provided at a lower portion of the flange part; and wherein a plurality of engagement claws that are provided on at least one edge part of the lid body are locked with engagement edge parts of the engagement holes when the plurality of engagement claws are inserted into the gap between the flange part and the side wall part which faces the flange part with the gap.

According to the protector of configuration (1) described above, when the engagement claws of the lid body are inserted into the gap between the side wall part of the main body and the flange part extending along the longitudinal direction in parallel with the outer surface of the side wall part, the engagement claws may be locked with the engagement edge parts of the engagement holes that are provided at the lower portion of the flange part. Accordingly, it may be possible not only to improve an appearance of the protector by eliminating an uneven shape on an outer surface of the protector, but also to suppress the protector from being caught by a peripheral component of the protector and a structure thereof when the protector is mounted on a mounted part of a vehicle body, and the like. Further, the uneven shape is not provided at a side of the accommodation part of the main body, such that the electrical wire bundle may be smoothly accommodated in the accommodation part.

Additionally, for example, when the electrical wire bundle accommodated in the accommodation part is pulled such that an external force is exerted on the lid body in a direction in which the lid body is lifted from the main body and thus the lid body deviates therefrom, the external force may be entirely received by the flange part that is formed along the longitudinal direction of the main body, and thus consequently the external force may be dispersed. As a result, it may be advantageously possible to suppress damage, and the like occurring when the external force is locally exerted thereon.

(2) The protector according to the configuration (1), wherein connection ribs are formed at both side parts of the engagement holes of the flange part and connect the flange part to the side wall part.

According to the protector of configuration (2) described above, when the engagement claw is locked with the engagement hole, the connection ribs may reinforce both side parts of the engagement hole on which a force is particularly exerted, thereby having an effect of suppressing damage caused by the force.

(3) The protector according to the configuration (1) or (2), wherein an edge part of the flange part formed at a front side in an insertion direction of the engagement claws into the gap and the side wall part are connected to each other by a bottom plate part.

According to the protector of configuration (3) described above, it may be advantageously possible not only to improve strength of the flange part by the bottom plate part, but also to transmit an external force exerted on the flange part to the main body and to disperse the external force by the bottom plate part.

According to embodiments of the present invention, it is advantageously possible not only to provide a desirable appearance of a protector, but also to provide a protector that is capable of suppressing an engagement portion between a main body and a lid body from being damaged.

As described above, the present invention is briefly described. Further, the present invention will now be described more fully hereinafter with reference to the accompanying drawings, in which exemplary embodiments of the present invention are shown.

BRIEF DESCRIPTION OF THE DRAWINGS

FIGS. 6A and 6B are views illustrating side wall parts of the main body in which a flange part is provided; wherein FIG. 6A is a cross-sectional view taken along A-A line of FIG. 5, and FIG. 6B is a cross-sectional view taken along B-B line of FIG. 5.

DETAILED DESCRIPTION OF THE EXEMPLARY EMBODIMENTS

Hereinafter, exemplary embodiments of the present invention will now be described with reference to the accompanying drawings.

Figure 1:
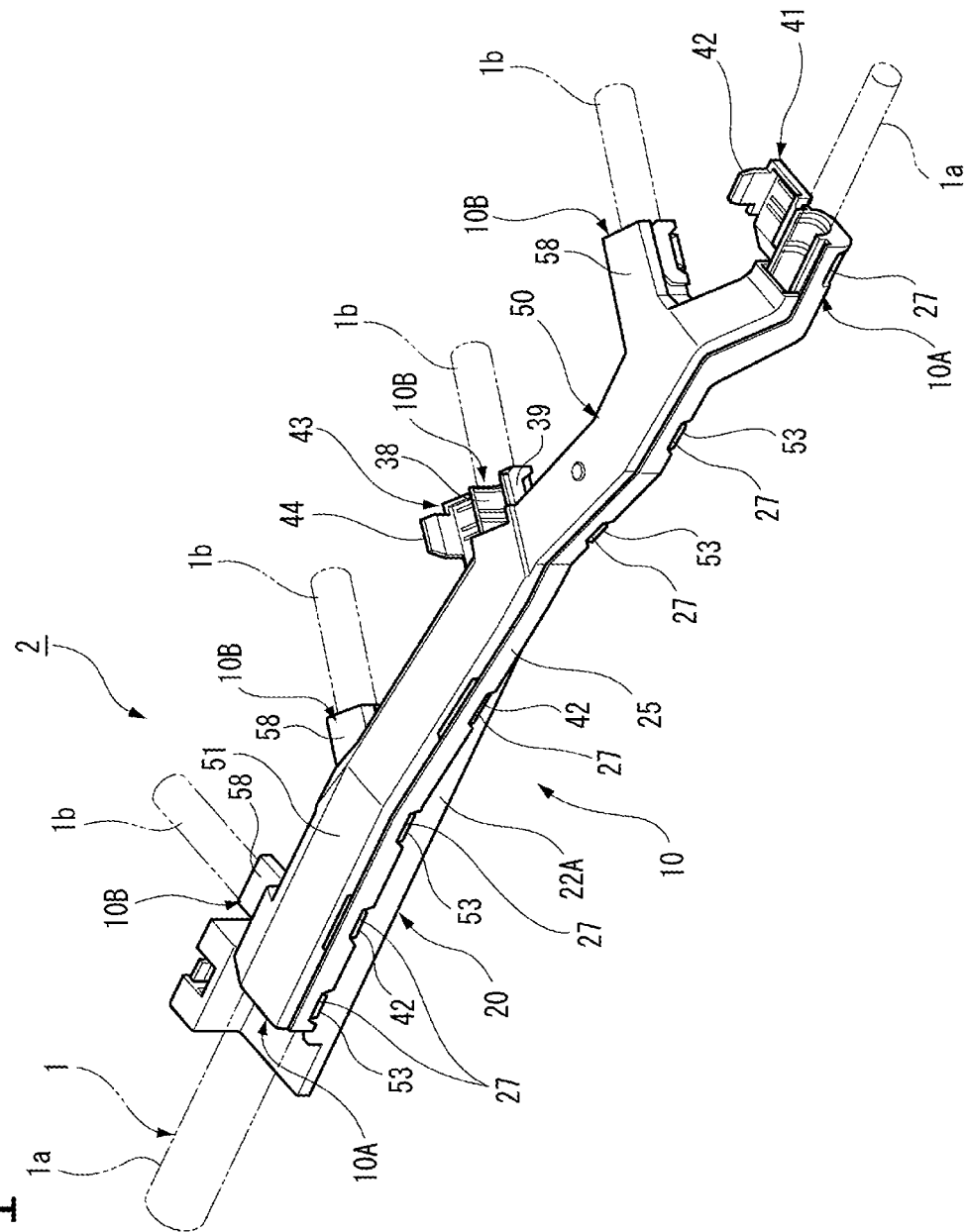
FIG. 1 is a perspective view illustrating a protector according to an exemplary embodiment of the present invention.
Figure 2:
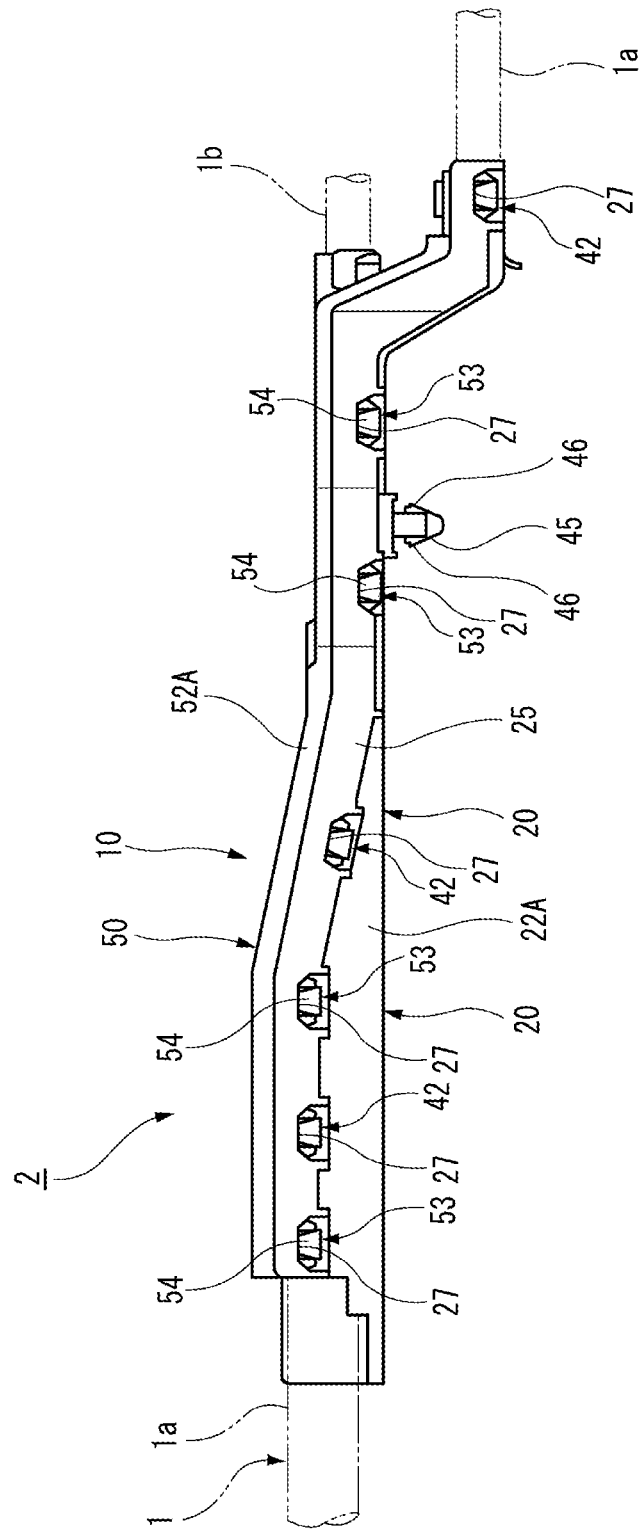
FIG. 2 is a side view illustrating the protector according to an exemplary embodiment of the present invention.

FIG. 1 is a perspective view illustrating a protector 10 according to an exemplary embodiment of the present invention. FIG. 2 is a side view illustrating the protector 10 according to an exemplary embodiment of the present invention.

As shown in FIGS. 1 and 2, a wire harness 2 is formed in such a manner that the protector 10 according to the exemplary embodiment is assembled to an electrical wire bundle 1 in which a plurality of electrical wires are bundled.

The protector 10 is formed in a long shape. The protector 10 includes a trunk line derivation part 10A at both end parts, and includes a branch line derivation part 10B disposed at a side part of an intermediate portion. With respect to the protector 10, a trunk line 1a of the electrical wire bundle 1, with which the wire harness 2 is formed, is derived from the trunk line derivation part 10A, and a branch line 1b of the electrical wire bundle 1, with which the wire harness 2 is formed, is derived from the branch line derivation part 10B.

The protector 10 is fixed to a mounted part of a vehicle body of a vehicle such as a car, and the like, such that the wire harness 2 is wired along a vehicle body surface. Further, the electrical wire bundle 1 that is derived from the trunk line derivation part 10A of the protector 10 and the branch line derivation part 10B thereof is protected by an exterior member such as a corrugated tube that is mounted on an outer circumferential portion of the wire bundle 1, and an adhesive tape that is wound around the outer circumferential portion thereof.

Figure 3:
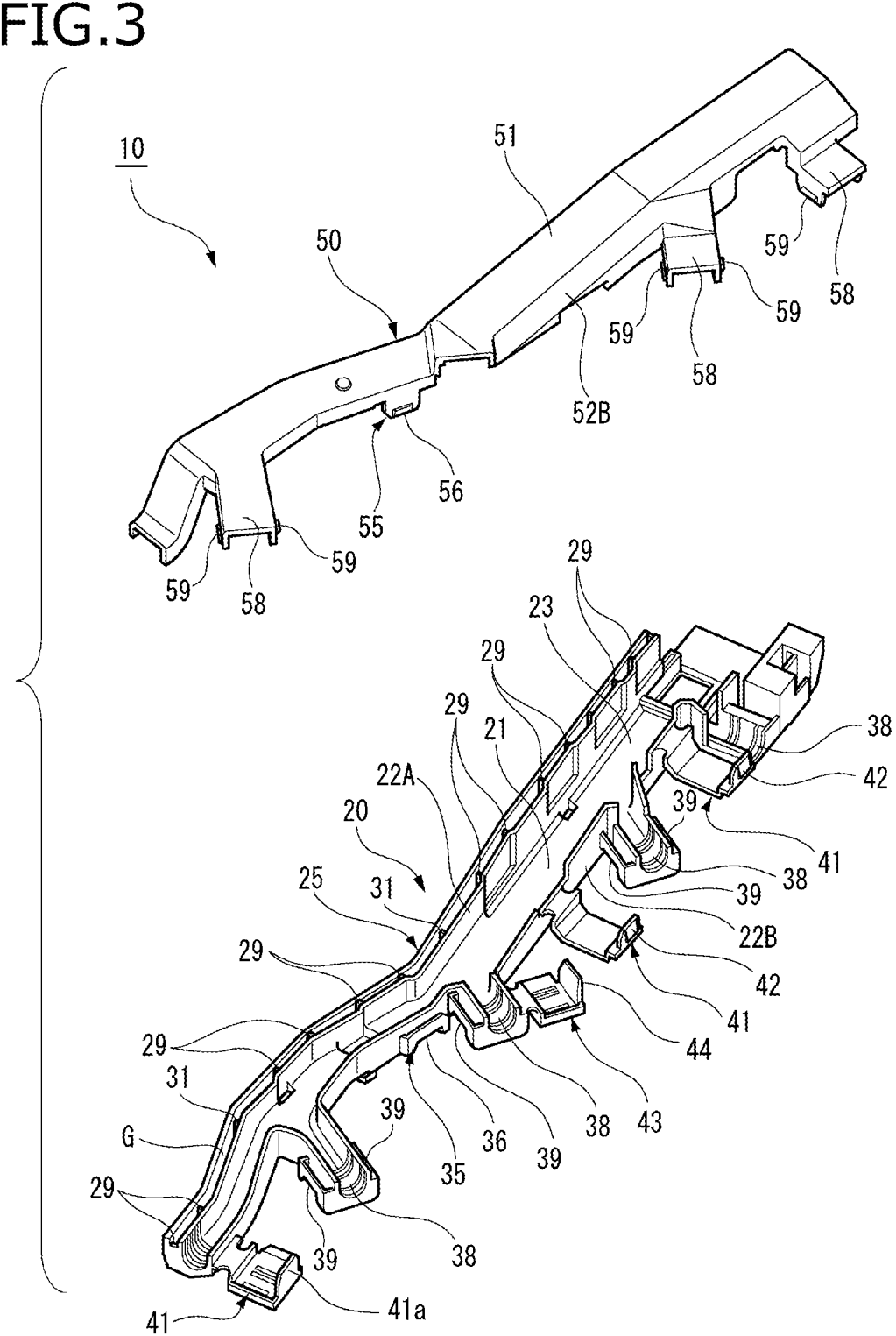
FIG. 3 is a perspective view illustrating a main body and a lid body of the protector according to an exemplary embodiment of the present invention.

FIG. 3 is a perspective view illustrating a main body 20 of the protector 10 and a lid body 50 thereof according to an exemplary embodiment of the present invention.

Figure 4:
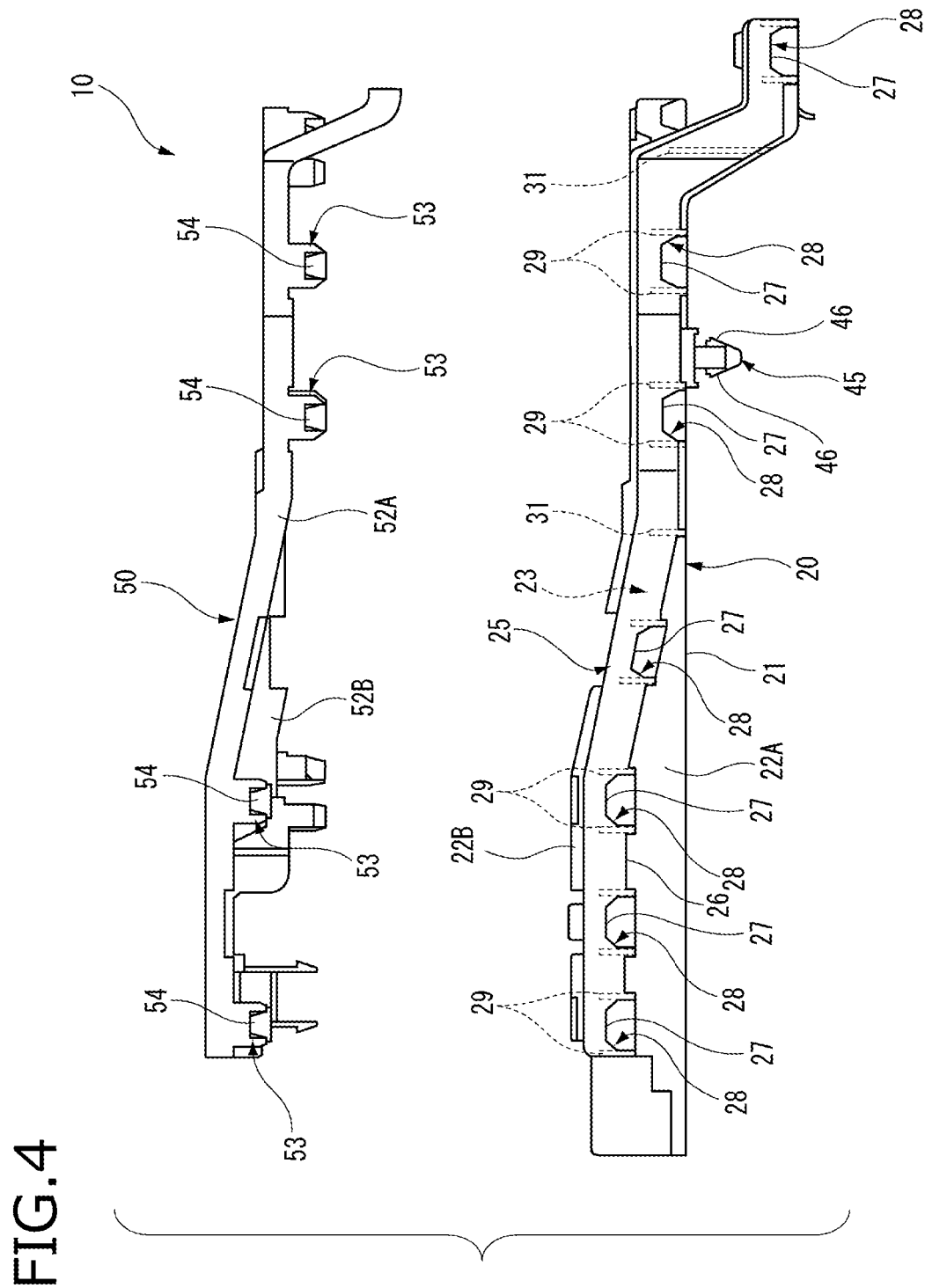
FIG. 4 is a side view illustrating the main body and the lid body of the protector according to an exemplary embodiment of the present invention.

FIG. 4 is a side view illustrating the main body 20 of the protector 10 and the lid body 50 thereof according to an exemplary embodiment of the present invention.

Figure 5:
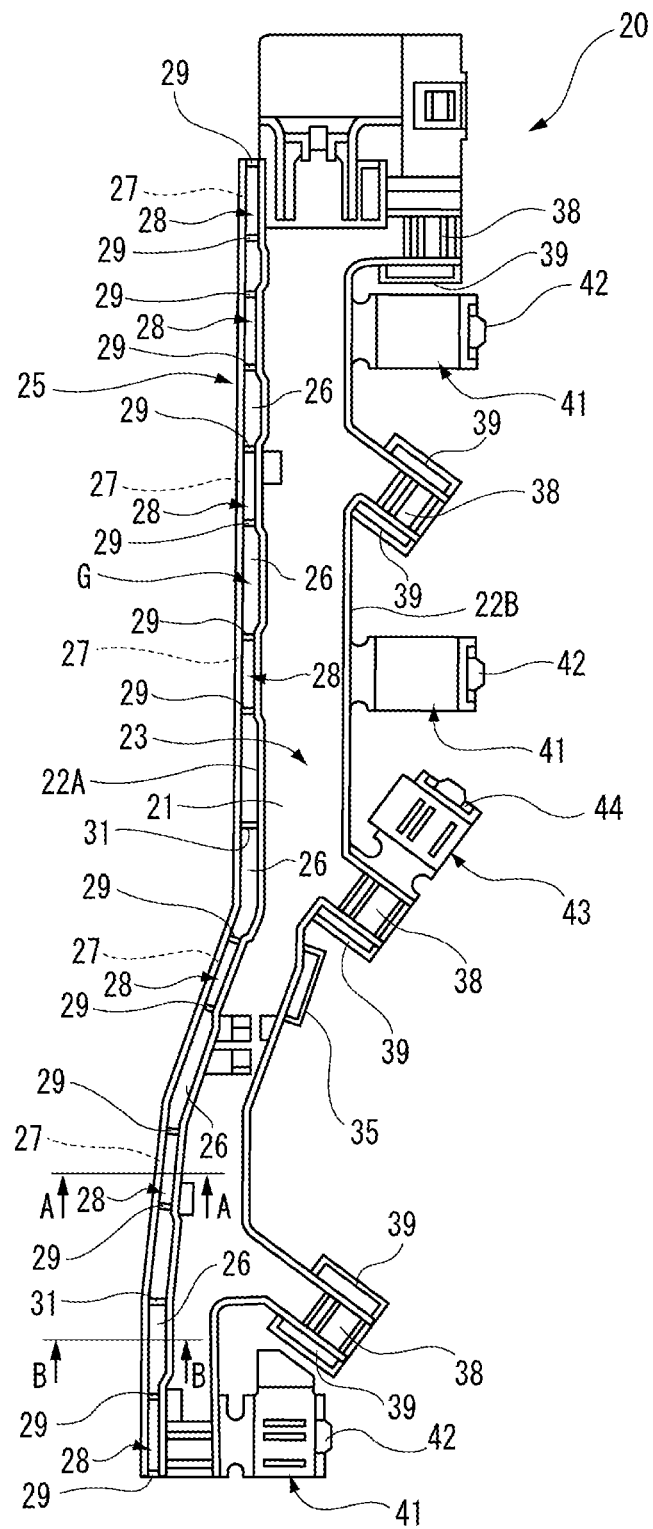
FIG. 5 is a top plan view illustrating the main body of the protector according to an exemplary embodiment of the present invention.

FIG. 5 is a top plan view illustrating the main body 20 of the protector 10 according to an exemplary embodiment of the present invention.

Figure 6A:
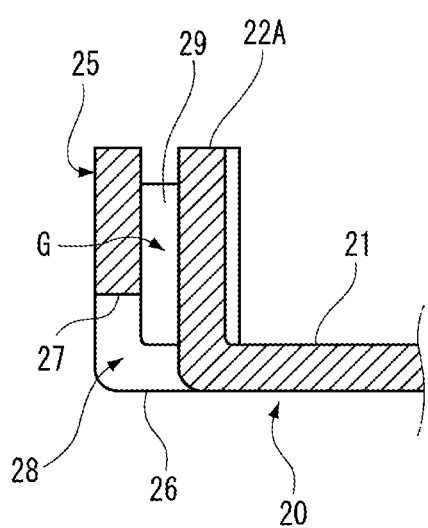
Figure 6B:
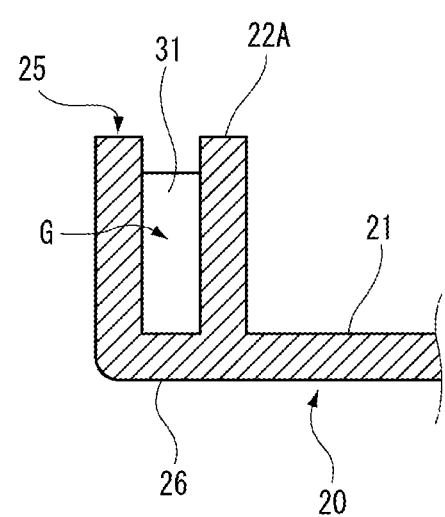

FIGS. 6A and 6B are views illustrating side wall parts of the main body 20 in which a flange part is provided. FIG. 6A is a cross-sectional view taken along A-A line of FIG. 5, and FIG. 6B is a cross-sectional view taken along B-B line of FIG. 5.

As shown in FIGS. 3 and 4, the protector 10 according to the exemplary embodiment includes the main body 20 and the lid body 50. The main body 20 and the lid body 50 are made of a synthetic resin material having insulation properties, and are integrally molded by injection molding process, and the like.

As shown in FIG. 5, the main body 20 includes a bottom wall part 21 and side wall parts 22A and 22B that are provided at both edge parts of the bottom wall part 21, and is formed in an approximately U-shape in a cross-sectional view. A portion of the main body 20 that is surrounded by the bottom wall part 21 and the side wall parts 22A and 22B is formed as an accommodation part 23 in which the electrical wire bundle 1 is accommodated.

A flange part 25 is formed at one side wall part 22A of the main body 20. The flange part 25 is formed along a longitudinal direction of the main body 20. The flange part 25 has a gap G towards an upper portion with respect to the side wall part 22A, that is to say the gap G is provided in the upper portion direction between the flange part A and the side wall part 22A, and extends in parallel with an outer surface side of the side wall part 22A. A plurality of engagement holes 28 are provided at a lower portion of the flange part 25. The plurality of engagement holes 28 are provided at a predetermined interval in the longitudinal direction of the main body 20.

As shown in FIG. 6A, the engagement hole 28 forms an engagement edge part 27 in such a manner that a cutout is formed at a lower portion of the flange part 25. A connection rib 29 is provided at both side parts of the engagement hole 28 in the gap G between the flange part 25 and the side wall part 22A. The connection rib 29 is formed along a vertical direction of the main body 20, and the connection rib 29 is formed to connect the flange part 25 and the side wall part 22A each other.

As shown in FIG. 6B, in the case of the flange part 25, a lower edge part of the flange part 25 is connected to an outer surface of the side wall part 22A by a bottom plate part 26 at a portion except the engagement hole 28 in which the engagement edge part 27 is formed. Specifically, the above-mentioned portion is not provided with the engagement hole. That is, an edge part on a front side in an insertion direction of an engagement claw 54 in the flange part 25 and an edge part of the bottom wall part 21 in the side wall part 22A are connected to each other by the bottom plate part 26.

Further, a plurality of reinforcement ribs 31 are appropriately formed in the gap G between the flange part 25 and the side wall part 22A that are connected to each other by the bottom plate part 26. The plurality of reinforcement ribs 31 are formed along the vertical direction of the main body 20 from the bottom plate part 26, such that the flange part 25 and the side wall part 22A are connected to each other by the plurality of reinforcement ribs 31.

In the other side wall part 22B of the main body 20, a frame-shaped receiving part 35 is formed on an outer surface of the side wall part 22B. The receiving part 35 is formed in a hollow cylindrical shape and is formed to protrude from the outer surface of the side wall part 22B. An engagement edge part 36 is formed at a lower edge of the receiving part 35. Further, a plurality of recessed parts 38, with which the branch line derivation parts 10B are formed, are formed at the other side wall part 22B of the main body 20.

Further, a trunk line clamp 41 is connected to the other side wall part 22B of the main body 20 via a thin hinge to be rotatable therearound. The thin hinge is formed at one side of the trunk clamp 41 and an engagement piece 42 is formed at the other opposite side thereof. The trunk clamp 41 is formed to be rotatable centering on a connection portion with the side wall part 22B, thereby covering an upper portion of the accommodation part 23 of the main body 20. Accordingly, the thin hinge and the engagement piece 42 that is formed at the other opposite side thereof are inserted into the gap G between the one side wall part 22A of the main body 20 and the flange part 25, thereby being engaged with the engagement edge part 27 of the corresponding engagement hole 28. Therefore, the trunk line 1a of the electrical wire bundle 1 that is accommodated in the accommodation part 23 of the main body 20 is temporarily held by the trunk line clamp 41.

Additionally, a branch line clamp 43 is connected to one side part of the recessed part 38, with which the branch line derivation part 10B that is disposed at an intermediate portion of the main body 20 in the longitudinal direction is formed, via a thin hinge to be rotatable. The thin hinge is formed at one side of the branch line clamp 43 and an engagement piece 44 is formed at the other opposite side thereof. The branch line clamp 43 is formed to be rotatable centering on a connection portion with the recessed part 38, thereby covering an upper portion of the recessed part 38. Accordingly, the thin hinge and the engagement piece 44 that is formed at the other opposite side thereof are inserted into a receiving part 39 formed at the other side part of the recessed part 38, thereby being engaged therewith. Therefore, the branch line 1b of the electrical wire bundle 1 that is accommodated in the recessed part 38 is held by the branch line clamp 43.

Further, the main body 20 includes a fixing clamp 45 on an outer surface side of the bottom wall 21 (refer to FIG. 4). The fixing clamp 45 is inserted into a locking hole (not shown) that is formed at a mounted part of a vehicle body, and the like, such that an engagement piece 46 formed in the fixing clamp 45 is locked with an edge part of the locking hole. Accordingly, the main body 20 of the protector 10 is fixed to the mounted part of the vehicle body by the fixing clamp 45.

The lid body 50 is mounted on the main body 20 to cover an opening side of the upper portion of the accommodation part 23 of the main body 20, thereby closing the accommodation part 23 of the main body 20. The lid body 50 includes an upper wall part 51 and protrusion parts 52A and 52B protruding from both edge parts of the upper wall part 51.

The protrusion part 52A that is provided at one side of the lid body 50 enters into the gap G between the one side wall part 22A of the main body 20 and the flange part 25. A plurality of engagement pieces 53 are provided in the protrusion part 52A entering into the gap G. The plurality of engagement pieces 53 are disposed at positions corresponding to the engagement holes 28 of the main body 20. The engagement piece 53 is formed to protrude in a mounting direction from the lid body 50 to the main body 20. The engagement claw 54 is protrusively provided on an outer surface side of the engagement piece 53. When the lid body 50 is mounted on the main body 20, the engagement claw 54 of the engagement piece 53 enters into the engagement hole 28 of the main body 20. Accordingly, the engagement claw 54 is locked with the engagement edge part 27 of the engagement hole 28, such that the engagement edge part 27 and the engagement piece 53 are engaged with each other.

An engagement piece 55 is formed at the protrusion part 52B that is provided at the other side of the lid body 50. The engagement piece 55 is arranged at a position corresponding to the receiving part 35 of the main body 20. The engagement piece 55 is formed to protrude in a mounting direction from the lid body 50 to the main body 20. An engagement claw 56 is protrusively provided on an outer surface side of the engagement piece 55. When the lid body 50 is mounted on the main body 20, the engagement claw 56 of the engagement piece 55 is locked with the engagement edge part 36 of the receiving part 35 of the main body 20, such that receiving part 35 and the engagement piece 55 are engaged with each other.

Further, a plurality of cover parts 58, with which the branch line derivation parts 10B are formed, are protrusively provided at an edge part where the protrusion part 52B that is provided at the other side of the lid body 50 is formed. The cover parts 58 are disposed at positions corresponding to the recessed parts 38 of the main body 20. The lid body 50 is mounted on the main body 20, such that the cover parts 58 are disposed to cover upper parts of the recessed parts 38 of the main body 20, thereby forming the branch line derivation parts 10B together with the recessed parts 38. Further, an engagement piece 59 that is provided at both edge parts of the cover part 58 is inserted into the receiving part 39 that is provided on both edge parts of the recessed part 38, thereby being engaged with each other.

Hereinafter, an example of a procedure, in which the wire harness 2 is wired on a vehicle body, and the protector 10 based upon the configuration described above is mounted on the electrical wire bundle 1, thereby being fixed to the vehicle body, will now be described.

As a first step, the wire bundle 1 is accommodated in the accommodation part 23 of the main body 20. At this time, the trunk line 1a of the electrical wire bundle 1 is derived from both ends of the main body 20, and the branch line 1b of the electrical wire bundle 1 is respectively accommodated in the recessed part 38. Next, the trunk line 1a of the electrical wire bundle 1 and the branch line 1b thereof are temporarily held by the trunk line clamp 41 and the branch line clamp 43.

Afterwards, the lid body 50 is mounted on the main body 20 to cover the main body 20. At this time, the protrusion part 52A that is provided at one side of the lid body 50 enters into the gap G between the one side wall part 22A of the main body 20 and the flange part 25. The engagement piece 53 that is formed at the protrusion part 52A that is provided at one side of the lid body 50 is inserted between the connection ribs 29 of the main body 20. Accordingly, the engagement claw 54 of the engagement piece 53 enters into the engagement hole 28, such that the engagement claw 54 is locked with the engagement edge part 27 of the engagement hole 28. Further, the engagement piece 55 of the protrusion part 52B that is provided at the other side of the lid body 50 is inserted into the receiving part 35 of the other side wall part 22B of the main body 20. Accordingly, the engagement claw 56 of the engagement piece 55 is locked with the engagement edge part 36 of the receiving part 35.

The lid body 50 is mounted on the main body 20 to cover the main body 20, such that an upper opening portion of the accommodation part 23 of the main body 20 is closed and the recessed part 38 of the main body 20 is closed by the cover part 58 of the lid body 50. Accordingly, the protector 10 is mounted on the electrical wire bundle 1.

When the protector 10 is mounted on the electrical wire bundle 1, the fixing clamp 45 that is formed at a bottom part of the main body 20 of the protector 10 is inserted into the locking hole that is formed at the mounted part of the vehicle body, thereby being locked with the edge part of the locking hole. In this way, the protector 10 is fixed to the mounted part thereof. Accordingly, the wire harness 2 in which the protector 10 is mounted on the electrical wire bundle 1 is wired on the mounted part of the vehicle body.

Meanwhile, the one side wall part 22A of the main body 20 of the protector 10 includes the flange part 25 extending along the longitudinal direction, such that an uneven shape, that is to say a concave-convex shape, on an outer surface of the protector 10 is eliminated as much as possible. Therefore, when the protector 10 is mounted on the mounted part of the vehicle body, it is advantageously possible to suppress the protector 10 from being caught by a peripheral component of the protector and a structure thereof Further, when the electrical wire bundle 1 is pulled such that an external force is exerted on the lid body 50 in a direction in which the lid body 50 is lifted from the main body 20 and thus the lid body 50 deviates therefrom, the external force may be entirely received by the flange part 25 that is formed along the longitudinal direction of the main body 20, and thus consequently the external force may be dispersed. As a result, it is advantageously possible to suppress damage, and the like occurring when the external force is locally exerted thereon.

As described above, according to the protector 10 in the exemplary embodiment, when the engagement claw 54 of the lid body 50 is inserted into the gap G between the one side wall part 22A of the main body 20 and the flange part 25 extending along the longitudinal direction in parallel with the outer surface side of the side wall part 22A, the engagement claw 54 of the engagement piece 53 is locked with the engagement edge part 27 of the engagement hole 28 that is provided at the lower portion of the flange part 25. Accordingly, it is possible not only to improve an appearance by eliminating the uneven shape on the outer surface of the protector 10, but also to suppress the protector 10 from being caught by the peripheral component of the protector and the structure thereof when the protector 10 is mounted on the mounted part of the vehicle body, and the like. Further, the uneven shape is not provided at a side of the accommodation part of the main body 20, such that the electrical wire bundle 1 may be smoothly accommodated in the accommodation part 23.

Additionally, for example, when the electrical wire bundle 1 accommodated in the accommodation part is pulled such that the external force is exerted on the lid body 50 in the direction in which the lid body 50 is lifted from the main body 20 and thus the lid body 50 deviates therefrom, the external force is entirely received by the flange part 25 that is formed along the longitudinal direction of the main body 20, and thus consequently the external force is dispersed. As a result, it is advantageously possible to suppress the damage, and the like occurring when the external force is locally exerted thereon.

Further, according to the protector 10 in the exemplary embodiment, the connection rib 29, by which the side wall part 22A and the flange part 25 are connected to each other, is formed at the both side parts of the engagement hole 28 of the main body 20. Therefore, when the engagement claw 54 is locked with the engagement hole thereof, the connection rib 29 may reinforce the both side parts of the engagement hole 28 on which a force is particularly exerted, thereby having an effect of suppressing damage caused by the force.

Further, according to the protector 10 in the exemplary embodiment, the edge part on the front side in the insertion direction of the engagement claw 54 in the flange part 25 and the side wall part 22A are connected to each other by the bottom plate part 26. Therefore, it is advantageously possible not only to improve strength of the flange part 25 by the bottom plate part 26, but also to transmit an external force exerted on the flange part 25 to the main body 20, thereby dispersing the external force by the bottom plate part 26.

Additionally, it is to be understood that the present invention is not limited to the disclosed embodiments, but, on the contrary, is intended to cover various modifications and equivalent arrangements included within the spirit and scoop of the appended claims. Further, a material, a shape, a dimension, a number, a disposition portion, etc., of each component in the disclosed embodiments are arbitrarily formed to achieve the present invention, and are not limited thereto.

For example, according to the embodiments, the flange part 25 is formed to extend along the longitudinal direction in parallel with the outer surface side of the one side wall part 22A of the main body 20, however, alternatively the flange part 25 may be formed to extend along the longitudinal direction in parallel with an outer surface side of the other side wall part 22B of the main body 20.

Further, the flange part 25 according to the embodiments is integrally formed to continuously extend along the longitudinal direction of the main body 20. Alternatively, the flange part 25 may be appropriately divided into a plurality of structures extending along the longitudinal direction of the main body 20.

Hereinafter, characteristics of the protector according to the exemplary embodiments of the present invention will now be briefly described from configurations [1] to [3].

[1] A protector (10) including:
a main body (20) that is formed with an accommodation part (23) for accommodating an electrical wire bundle (1) by a bottom wall part (21) and side wall parts (22A and 22B) which are respectively erected from both side edges of the bottom wall part;
a lid body (50) that is mounted on the main body (20) to cover the accommodation part (23); and
a flange part (25) that extends along a longitudinal direction of the main body (20) with a gap (G) at an upper portion in parallel with an outer surface of at least one (22A) of the side wall parts (22A and 22B) of the main body (20),
wherein a plurality of engagement holes (28) are provided at a lower portion of the flange part (25); and wherein a plurality of engagement claws (54) that are provided on at least one edge part of the lid body (50) are locked with engagement edge parts (27) of the engagement holes (28) when the plurality of engagement claws (54) are inserted into the gap (G) between the flange part (25) and the side wall part (22A) which faces the flange part with the gap (G).

[2] The protector (10) according to configuration 1, wherein connection ribs (29) are formed at both side parts of the engagement holes (28) of the flange part (25) and connect the flange part (25) to the side wall part (22A).

[3] The protector 10 according to configuration 1 or 2, wherein an edge part of the flange part (25) formed at a front side in an insertion direction of the engagement claw (54) into the gap (G) and the side wall part (22A) are connected to each other by a bottom plate part (26).

What is claimed is:

1. A protector comprising:
   a main body that is formed with an accommodation part for accommodating an electrical wire bundle by a bottom wall part and side wall parts which are respectively erected from both side edges of the bottom wall part;
   a lid body that is mounted on the main body to cover the accommodation part; and
   a flange part that extends along a longitudinal direction of the main body with a gap at an upper portion in parallel with an outer surface of a first side wall part of the side wall parts of the main body,
   wherein a plurality of engagement holes are provided at a lower portion of the flange part, the plurality of engagement holes being apart from each other in the longitudinal direction of the main body;
   wherein a plurality of engagement claws are provided on at least one edge part of the lid body, and are locked with engagement edge parts of the engagement holes when the plurality of engagement claws are inserted into the gap between the flange part and the first side wall part which faces the flange part with the gap; and
   wherein the flange part continuously extends across the plurality of engagement holes along the longitudinal direction of the main body.

2. The protector according to claim 1, wherein connection ribs are formed at both side parts of each of the engagement holes of the flange part and connect the flange part to the first side wall part.

3. The protector according to claim 1, wherein an edge part of the flange part, formed at a front side in an insertion direction of the engagement claws into the gap, and the first side wall part are connected to each other by a bottom plate part.

4. The protector according to claim 3, wherein the bottom plate part is located, along the longitudinal direction of the main body, between two of a plurality of connection ribs and between two of the plurality of engagement holes, the plurality of connection ribs being formed at both side parts of each of the engagement holes of the flange part and connecting the flange part to the first side wall part.

5. The protector according to claim 1, wherein
   the flange part comprises a wall that extends along the longitudinal direction of the main body, the gap being formed between the wall of the flange part and the outer surface of the first side wall part of the main body, and
   the plurality of engagement holes are provided at a lower portion of the wall of the flange part.

6. The protector according to claim 5, wherein connection ribs are formed at both side parts of each of the engagement holes of the flange part and connect the wall of the flange part to the first side wall part.

7. The protector according to claim 1, further comprising:
   a clamp including an engagement claw that locks with an engagement edge part of one of the engagement holes when the engagement claw of the clamp is inserted into the gap between the flange part and the first side wall part, wherein
   the clamp is rotatably connected to a second side wall part of the side wall parts, and the clamp is configured to rotate around the second side wall part such that the clamp covers the accommodation part and the engagement claw of the clamp enters the gap, and
   the lid body is configured to cover the accommodation part and the clamp.

\* \* \* \* \*